United States Patent
Moon

(10) Patent No.: US 8,557,411 B2
(45) Date of Patent: Oct. 15, 2013

(54) SECONDARY BATTERY WITH A CONNECTION TAB FOLDED AROUND AN INSULATOR AND METHOD OF MANUFACTURING THE SAME

(75) Inventor: Deayon Moon, Suwon-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 318 days.

(21) Appl. No.: 12/795,006

(22) Filed: Jun. 7, 2010

(65) Prior Publication Data

US 2011/0039131 A1 Feb. 17, 2011

Related U.S. Application Data

(60) Provisional application No. 61/233,935, filed on Aug. 14, 2009.

(51) Int. Cl.
*H01M 14/00* (2006.01)
*H01M 4/82* (2006.01)
*H01M 6/00* (2006.01)

(52) U.S. Cl.
USPC .............. 429/7; 228/155; 29/632.5; 29/623.1

(58) Field of Classification Search
None
See application file for complete search history.

(56) References Cited

U.S. PATENT DOCUMENTS

| | | |
|---|---|---|
| 6,773,848 B1 | 8/2004 | Nortoft et al. |
| 2003/0224246 A1* | 12/2003 | Watanabe et al. ............. 429/159 |
| 2005/0221176 A1* | 10/2005 | Kim ............... 429/175 |
| 2006/0032667 A1 | 2/2006 | Sato |
| 2006/0159987 A1 | 7/2006 | Kikuchi et al. |
| 2006/0275658 A1 | 12/2006 | Sanada et al. |
| 2007/0126394 A1 | 6/2007 | Kim et al. |
| 2007/0207377 A1 | 9/2007 | Han et al. |
| 2009/0162747 A1* | 6/2009 | Zhu et al. ..................... 429/160 |
| 2009/0325043 A1 | 12/2009 | Yoon et al. |

FOREIGN PATENT DOCUMENTS

| | | |
|---|---|---|
| CN | 101322264 A | 12/2008 |
| FR | 2869463 A1 | 10/2005 |
| JP | 2003109559 | 4/2003 |
| JP | 2003-530658 A | 10/2003 |
| JP | 2004-095357 A | 3/2004 |
| JP | 2004273221 | 9/2004 |
| JP | 2006339031 | 12/2006 |
| JP | 2007-048722 A | 2/2007 |

(Continued)

OTHER PUBLICATIONS

European Search Report dated Nov. 15, 2010 issued by EPO corresponding to European Patent Application No. 10172474.7-1227.

(Continued)

*Primary Examiner* — Barbara Gilliam
*Assistant Examiner* — Jennifer Rea
(74) *Attorney, Agent, or Firm* — Robert E. Bushnell, Esq.

(57) ABSTRACT

A secondary battery in which electric connection between an electrode tab of a bare cell and a connection tab of a protective circuit module is performed by welding the electrode tab of the bare cell to the connection tab of the protective circuit module that form a battery pack. A process is provided so that electrode tabs of two or more laminated bare cells are easily and precisely welded to a single, or more, connection tabs by a worker. The welding process is effectively performed and welding strength between the tabs increases.

13 Claims, 10 Drawing Sheets

(56) References Cited

FOREIGN PATENT DOCUMENTS

| JP | 2009-517832 A | 4/2009 |
|---|---|---|
| KR | 1020050015922 A | 2/2005 |
| KR | 1020070110565 A | 11/2007 |

OTHER PUBLICATIONS

Japanese Office Action dated Dec. 11, 2012 issued by JPO. Corresponding to JP2010-180324 with Request of entry of the accompanying office Action.

Japanese Office Action dated Apr. 9, 2013 issued by JPO in connection with Japanese Patent Application 2010-180324, which also claims U.S. Appl. No. 61/233,935 as its priority document. Request for Entry of the accompanying Office Action attached herewith.

Chinese OA issued on Jul. 5, 2013 (corresponding Chinese patent application No. 201010251640.1). "Request for entry" attached herewith.

* cited by examiner

SECONDARY BATTERY WITH A CONNECTION TAB FOLDED AROUND AN INSULATOR AND METHOD OF MANUFACTURING THE SAME

CLAIM OF PRIORITY

This application makes reference to, incorporates the same herein, and claims all benefits accruing under 35 U.S.C. §119 from an application earlier filed in the United States Patent and Trademark Office on 14 Aug. 2009 and there duly assigned Ser. No. 61/233,935.

BACKGROUND OF THE INVENTION

1. Field of the Invention

The present invention relates to a secondary battery.

2. Description of the Related Art

In a secondary battery two secondary cells may be laminated and electrically connected to a protective circuit module to form a battery pack. When a plurality of secondary cells is laminated to be electrically connected to each other, the connection may be performed by spot welding.

Spot welding is a kind of resistance welding mainly used to weld metal members. The principle is that members to be welded are melted and welded by Joule heat generated when current flows through the members for a short time. The spot welding is classified into a single phase AC series method and a DC direct method. In the direct method, two members to be welded are brought into surface contact with each other and two welding rods contact rear sides of the members to face each other, and electric current is applied thereto to perform welding. In the series method, when two members to be welded are brought into surface contact with each other and two welding rods contact a side of one of the members in parallel, electric current is applied to perform welding. The direct spot welding is used when welding space is guaranteed at both sides of the members to be welded. The series spot welding is used when welding space is not provided at a side of the members to be welded.

In general, the series spot welding may be performed during the manufacturing of a secondary battery. Since, in the series spot welding, two welding rods may not be parallel to each other, workability is enhanced and welding may be easily performed even at a narrow space. However, in the series spot welding, when a welding length is increased due to a thick material to be welded, welding force decreases.

The above information disclosed in this Related Art section is only for enhancement of understanding of the background of the invention and therefore it may contain information that does not form the prior art that is already known in this country to a person of ordinary skill in the art.

SUMMARY OF THE INVENTION

An aspect of the present invention is a secondary battery having a first bare cell having electrode tabs, a second bare cell having electrode tabs, a connection tab spot-welded to electrode tabs of the first and second bare cell. The first and second bare cell may be folded along a center line of the connection tab. Further, a protective circuit module (PCM) electrically may be coupled to the connection tab.

Still further, the electrode tabs of the first and second bare cells may include a positive electrode tab and a negative electrode tab.

Still further, the connection tab may include a positive electrode lead and a negative electrode lead.

Still further, the electrode tabs of the first and second bare cell may further include positive electrode tabs of the first and second bare cells direct spot welded to the positive electrode lead of the connection tab, and negative electrode tabs of the first and second bare cells direct spot welded to the negative electrode lead of the connection tab.

Still further, the electrode tabs of the first and second bare cell, may further include positive electrode tabs of the first and second bare cells series spot welded to the positive electrode lead of the connection tab, and negative electrode tabs of the first and second bare cells series spot welded to the negative electrode lead of the connection tab.

Still further, the connection tab may be partially surrounded by a cover layer.

Still further, the second bare cell may be folded 180 degrees along a center line of the connection tab.

Still further, the PCM may control the charge and discharge of the first and second bare cells.

Still further, the connection tab may have a bending portion to facilitate the folding of the second bare cell.

Still further, the first and second bare cell may be folded causing the first and second bare cell to be parallel and in contact with each other.

Another aspect of the present invention is a secondary battery, having an insulator, a connection tab folded along a center line to surround the insulator, a first bare cell having electrode tabs, a second bare cell having electrode tabs, the electrode tabs of the first and second bare cell series spot welded to the folded connection tab, and a protective circuit module (PCM) having electrode leads connected to the connection tab.

Still further, the electrode tabs of the first and second bare cells may include a positive electrode tab and a negative electrode tab.

Still further, the connection tab may include a positive electrode lead and a negative electrode lead.

Still further, the positive electrode tabs of the first and second bare cells may be spot welded to the positive electrode lead of the connection tab, and the negative electrode tabs of the first and second bare cells may be spot welded to the negative electrode lead of the connection tab.

Still further, the PCM may control the charging and discharging of the first and second bare cells.

Still further, the first and second bare cell may be laminated causes the first and second bare cell to be parallel and in contact.

Still further, with the folding of the connection tab the insulating layer may be sandwiched inside the connection tab and the connection tab may be divided into a top connection tab above the insulating layer and a bottom connection tab below the insulting layer.

Still further, at least one end of the connection tab may be surrounded by a cover layer.

Still further, both ends of the connection tab may be surrounded by a cover layer.

Still further, the electrode tab of the first bare cell may be spot welded to the top connection tab and the electrode tab of the second bare cell may be spot welded to the bottom connection tab.

Another aspect of the present invention is a secondary battery, having a first connection tab, a second connection tab, an insulting layer formed between the first and the second connection tab, electrode tabs of a first bare cell series spot welded to the first connection tab, electrode tabs of a second bare cell series spot welded to the second connection tab, and a protective circuit module (PCM) with electrode leads connected to the first and second connection tabs.

Still further, both ends of the first and the second connection tabs may be surrounded by a cover layer.

Another aspect of the present invention is a method of manufacturing a secondary battery that includes spot-welding electrode tabs of a first and second bare cell to a connection tab, folding the first and second bare cell along a center line of the connection tab, and welding electrode leads of the connection tab to electrode leads of a protective circuit module (PCM).

Still further, the electrode tabs of the first and second bare cells may include a positive electrode tab and a negative electrode tab.

Still further, the connection tab may include a positive electrode lead and a negative electrode lead.

Still further, direct spot welding of the positive electrode tabs of the first and second electrode bare cells to the positive electrode tab of the connection tab may occur. Also direct spot welding the negative electrode tabs of the first and second electrode bare cells to the negative electrode tab of the connection tab may occur.

Still further, series spot welding the positive electrode tabs of the first and second electrode bare cells to the positive electrode tab of the connection tab may occur. Also, series spot welding the negative electrode tabs of the first and second electrode bare cells to the negative electrode tab of the connection tab may occur.

Still further, the connection tab may be partially surrounded by a cover layer.

Still further, the folding of the second bare cell along a center line of the connection tab may fold the second bare cell by 180 degrees.

Still further, the PCM may control the charging and discharging of the first and second bare cells.

Still further, the connection tab may have a bending portion to facilitate the folding of the second bare cell.

Still further, the folding of the first and second bare cell may cause the first and second bare cell to be parallel and in contact.

Another aspect of the present invention is a method of manufacturing a secondary battery, that includes disposing an insulation layer on one surface of a connection tab, folding the connection tab along a center line of the connection tab, spot-welding electrode tabs of a first and second bare cell to the folded connection tab, and welding electrode leads of the connection tab to electrode leads of a protective circuit module (PCM).

Still further, the electrode tabs of the first and second bare cells may include a positive electrode tab and a negative electrode tab.

Still further, the connection tab include a positive electrode lead and a negative electrode lead.

Still further, series spot welding the electrode tabs of the first electrode bare cells to a first side of the folded connection tab may occur. Also, series spot welding the electrode tabs of the second electrode bare cells to a second side of the folded connection tab may occur.

Still further, the PCM may control the charging and discharging of the first and second bare cells.

Still further, the first and second bare cell may be laminated so that the first and second bare cells are parallel and in contact with each other.

Still further, upon the folding of the connection tab, the insulating layer may be sandwiched inside the connection tab and the connection tab may be divided into a top connection tab above the insulating layer and a bottom connection tab below the insulting layer.

Still further, at least one end of the connection tab may be surrounded by a cover layer.

Still further, both ends of the connection tab may be surrounded by a cover layer.

Another aspect of the present invention is a method of manufacturing a secondary battery, that includes forming an insulting layer between a first and a second connection tab, spot-welding electrode tabs of a first bare cell to the first connection tab, spot-welding electrode tabs of a second bare cell to the second connection tab, and welding electrode leads of the first and second connection tab to electrode leads of a protective circuit module (PCM).

Still further, both ends of the first and the second connection tabs may be surrounded by a cover layer.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE EMBODIMENTS

Figure 1:
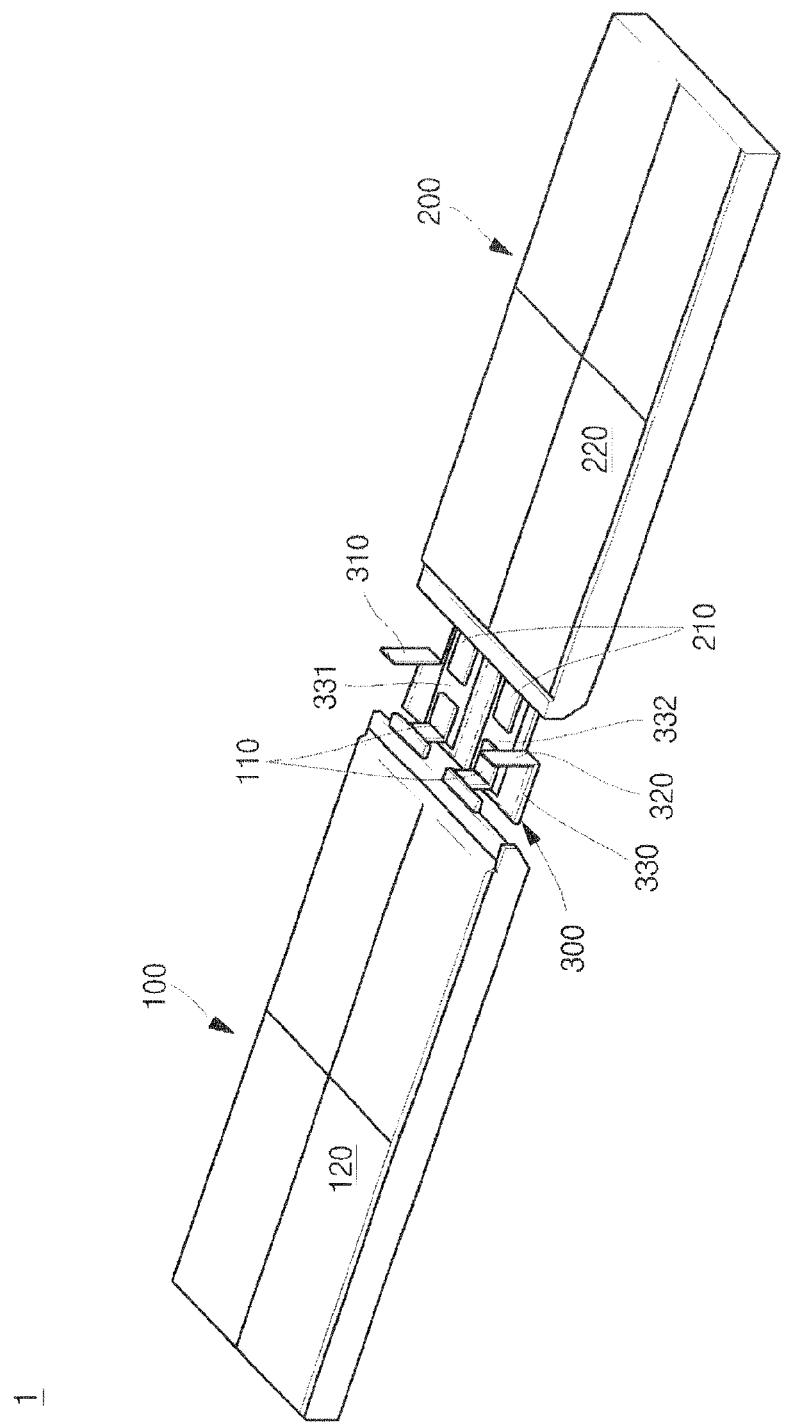
FIG. 1 is a perspective view illustrating a secondary battery in which two bare cells are connected to each other according to an embodiment of the present invention.
Figure 2:
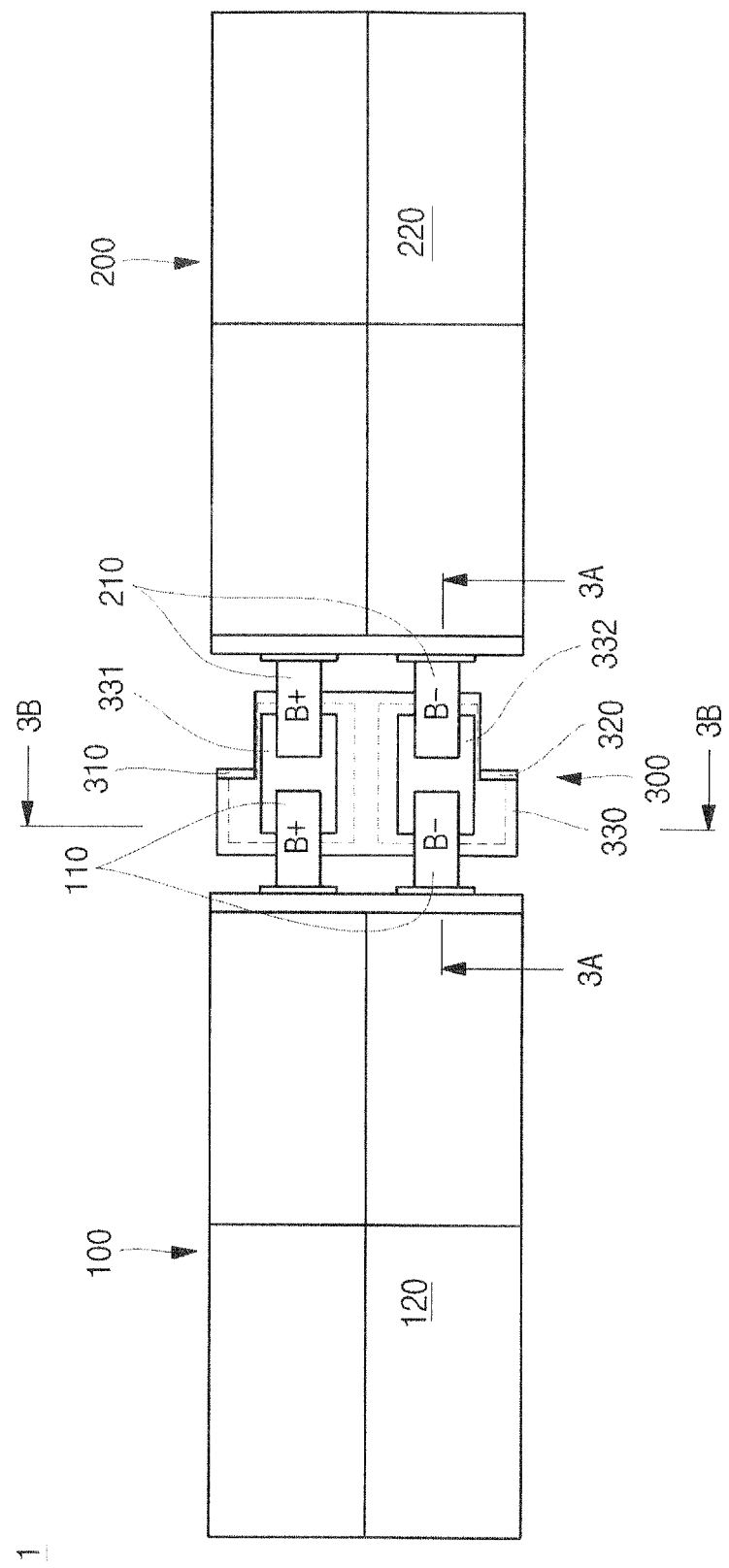
FIG. 2 is a plan view illustrating the secondary battery of FIG. 1.
Figure 3A:
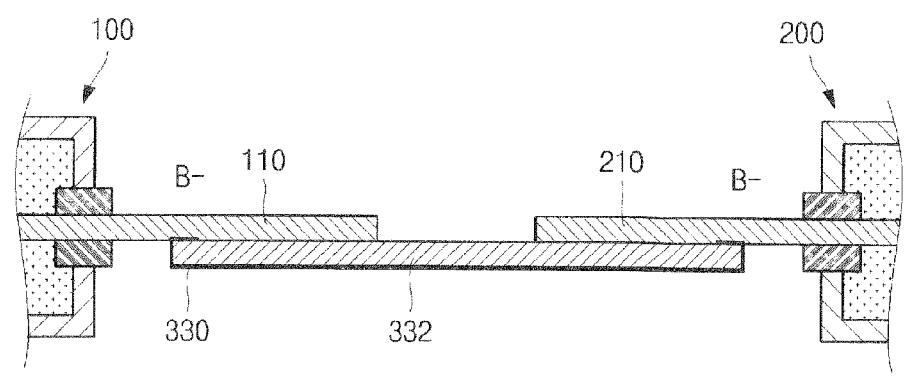
FIG. 3A is a sectional view taken along the line 3A-3A of FIG. 2.
Figure 3B:
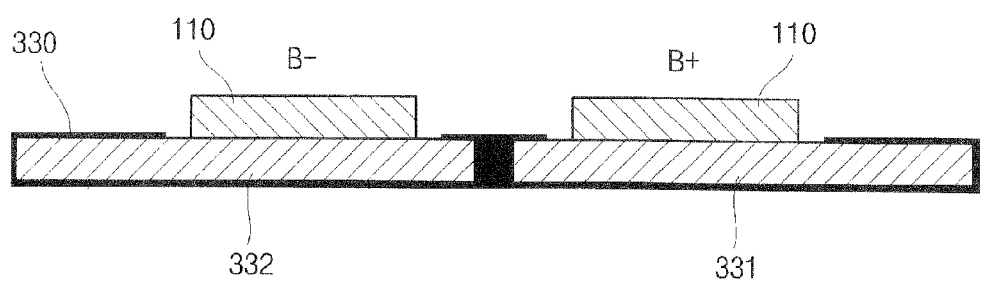
FIG. 3B is a sectional view taken along the line 3B-3B of FIG. 2.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In order to describe the present invention more clearly, parts that are not related to the description will be omitted from the drawings, and the same symbols will be given to similar parts throughout the specification.

Furthermore, as the size and thickness of the respective structural components shown in the drawings are arbitrarily illustrated for explanatory convenience, the present invention is not necessarily limited to as illustrated.

In the drawings, the thickness of layers, films, panels, regions, etc., are exaggerated for clarity. It will be understood that when an element such as a layer, film, region, or substrate is referred to as being "on" another element, it can be directly on the other element or intervening elements may also be present. In contrast, when an element is referred to as being "directly on" another element, there are no intervening elements present.

In the secondary battery of the exemplary embodiments of the present invention, an electrode assembly made by laminate a positive electrode, a separator, and a negative electrode or winding a lamination thereof and positive and a negative electrode tabs which are coupled to the positive electrode and the negative electrode of the electrode assembly respectively, are accommodated in a case. This state is referred to as a "bare cell." The case is classified into a cylinder can type case, a polygonal can type case, and a pouch type case in which a plurality of thin films is laminated.

The bare cell may be connected to a protective circuit controlling a charging voltage and a discharging voltage of a battery. An assembly having the protective circuit is generally referred to as a protective circuit module (PCM). That is, the bare cell is electrically connected to the PCM to form a battery pack. The positive electrode tab and the negative electrode tab which are withdrawn from the case are electrically connected to the PCM. In this case, the positive electrode tab and the negative electrode tab of the bare cell are connected to connection tabs withdrawn from the PCM. The electrode tabs and the connection tabs of the bare cell may be welded to each other by resistance welding or ultrasonic welding. Since the ultrasonic welding is complicated and its installation fee is expensive, the spot welding is often mainly applied to welding between the metal tabs.

FIGS. 1 to 4 are views illustrating a secondary battery according to an exemplary embodiment of the present invention.

In a secondary battery according to the exemplary embodiment of the present invention, electrode tabs of two bare cells are electrically connected to each other through a single connection tab. When the connection tab is folded, the two bare cells are laminated in a vertical direction so that they may be parallel and may be in contact with each other.

A secondary battery according to an exemplary embodiment of the present invention includes first and second bare cells 100 and 200, an electrode tab 110 having a positive electrode tab and a negative electrode tab that are respectively withdrawn from a positive electrode plate (not shown) and a negative electrode plate (not shown) of the first bare cell 100, an electrode tab 210 having a positive electrode tab and a negative electrode tab of the second bare cell 200, and a connection tab 300 to which the electrode tabs 110 and 210 are electrically connected by welding.

The first and second bare cells 100 and 200 may be bare cells of a pouch type secondary battery respectively having aluminum cases 120 and 220, but the cases 120 and 220 are not limited to the pouch type. The cases 120 and 220 accommodate electrode assemblies (not shown) each of which a positive electrode, a separator, and a negative electrode are wound or laminated. In the electrode assemblies, the electrode tabs 110 and 210 are electrically connected to the positive electrode and the negative electrode respectively.

The electrode tabs 110 and 210 may be partially attached to the positive electrode and the negative electrode and are withdrawn out of the cases 120 and 220. Positive electrode tabs B+ and negative electrode tabs B− of the first and second bare cells 100 and 200 may be connected to each other through the connection tab 300.

The connection tab 300 may include a positive electrode connection tab 331 to which the positive electrode tabs B+ of the electrode tabs 110 and 210 may be welded and a negative electrode connection tab 332 to which the negative electrode tabs B− of the electrode tabs 110 and 210 may be welded.

The positive electrode connection tab 331 or the negative electrode connection tab 332 may be made of nickel or nickel alloy, but is not limited thereto. A positive electrode lead 310 is provided in the positive electrode connection tab 331 and a negative electrode lead 320 is provided in the negative electrode connection tab 332. The positive electrode connection tab 331 and the negative electrode connection tab 332 are electrically connected to electrode leads 410 and 420 of a protective circuit module (PCM) 400, respectively.

The connection tab 300 includes a cover layer 330 being electrically insulated and connecting the positive electrode connection tab 331 to the negative electrode connection tab 332. The cover layer 330 is a film layer used for electrical insulation and may be composed of a polyimide (PI) film. The cover layer 330 surrounds outer surfaces of the positive electrode connection tab 331 and the negative electrode connection tab 332, but may be not formed on regions of the positive and negative electrode connection tabs 331 and 332 to which the electrode tabs 110 and 210 are connected. The positive electrode connection tab 331 and the negative electrode connection tab 332 are partially exposed to the outside of the cover layer 330 and are connected to the electrode tabs 110 and 210.

A manufacturing method of the secondary battery 1 according to an exemplary embodiment of the present invention will be described as follows.

Figure 5A:
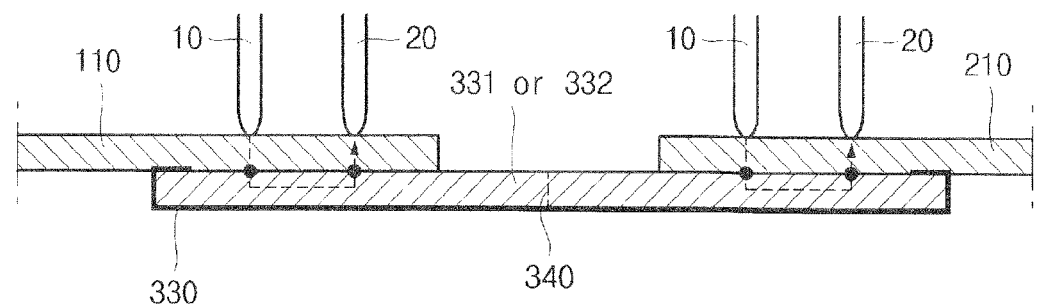
FIGS. 5A and 5B are schematic views illustrating welding state between an electrode tab and a connection tab of the secondary battery according to the embodiment of the present invention.
Figure 5B:
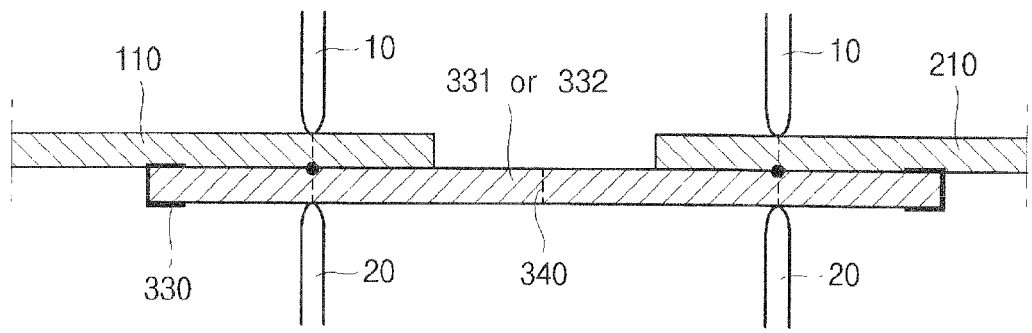

As illustrated in FIG. 5A, the positive electrode tab B+ and the negative electrode tab B− of the electrode tabs 110 and 210 of the first and second bare cells 100 and 200 may be spot-welded to the positive electrode tab 331 and the negative electrode tab 332 of the connection tab 300. In this case, since the lower side of the connection tab is surrounded with the cover layer 330, the series spot welding is performed by two welding rods 10 and 20. Moreover, as illustrated in FIG. 5B, the positive electrode tab B+ and the negative electrode tab B− of the electrode tabs 110 and 210 of the first and second bare cells 100 and 200 are welded to the positive electrode tab 331 and the negative electrode tab 332 of the connection tab 300 in the direct spot welding method. In this case, since the cover layer 330 does not surround the lower side of the connection tab 300, an insulator (not shown) may be attached to the connection tab 300 when the connection tab 300 is folded.

Next, the second bare cell 200 may be laminated on the first bare cell 100. That is, the second bare cell 200 is folded by 180 degrees along the center line of the connection tab 300. Thus, the first and second bare cells 100 and 200 are laminated in the vertical direction in such a fashion that they are parallel to each other and may come in contact.

Figure 4:
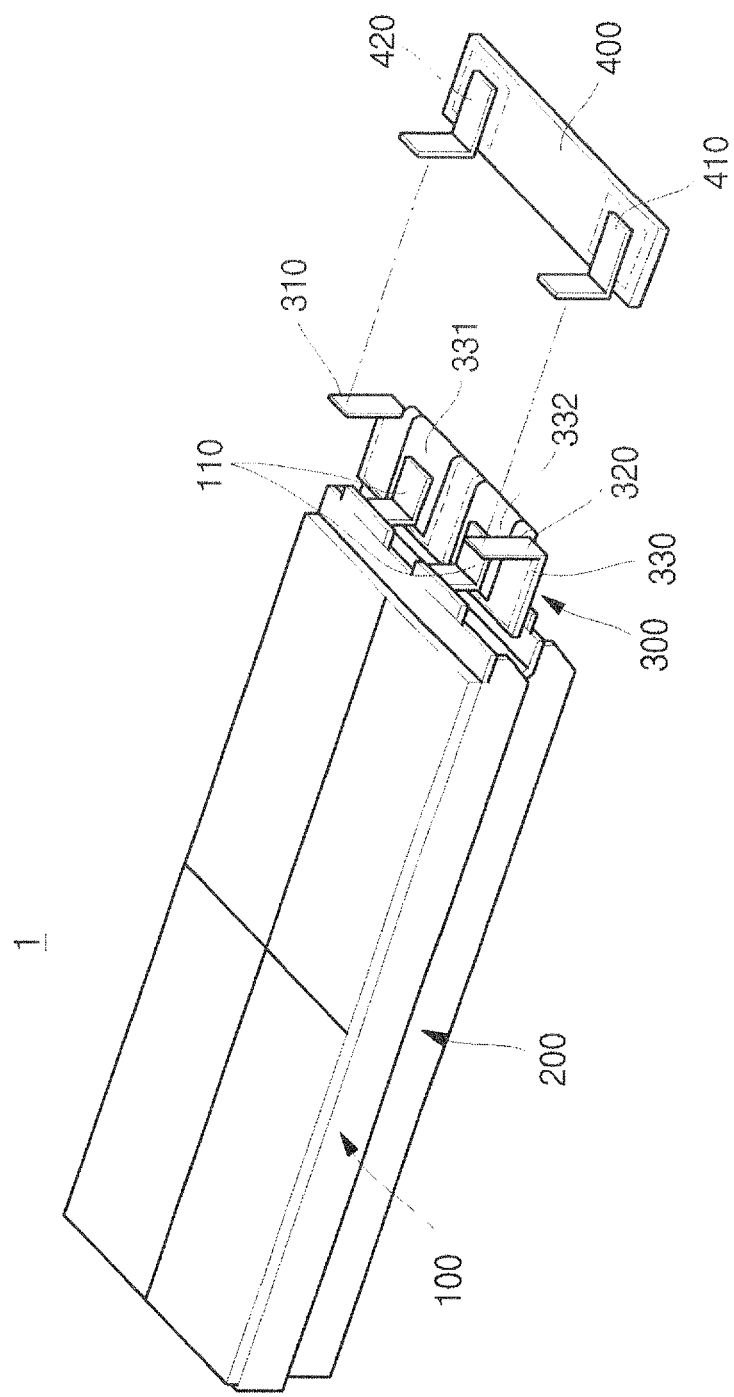
FIG. 4 is a perspective view illustrating the secondary battery in which bare laminated bare cells are connected to a protective circuit module, according to the embodiment of the present invention.

As illustrated in FIG. 4, the electrode leads 310 and 320 of the positive and negative electrode connection tabs 331 and 332 of the connection tab 300 may be welded to the electrode leads 410 and 420 the PCM 400. Thus, when the first and second bare cells 100 and 200 are laminated, the first and second bare cells 100 and 200 are electrically connected to the PCM 400 through the connection tab 300. As such, a battery pack is completed when the first and second laminated bare cells 100 and 200 are connected to the PCM 400.

The first and second laminate bare cells 100 and 200 are controlled to discharge or to be charged by a single PCM 400.

As such, the battery exhibits high voltage and high output and exhibits high capacity when the two laminated bare cells 100 and 200 are electrically connected to each other.

The connection tab 300 may have a cutting portion 340 formed in the center thereof. The cutting portion 340 enables the connection tab 300 to be folded at the same position and the folding of the connection to be easily performed. The cutting portion 340 may be a groove or a notch, but not limited to either.

Next, a secondary battery according to another exemplary embodiment of the present invention will be described with reference to FIGS. 5C and 5D.

A secondary battery according to another embodiment of the present invention is identical to the secondary battery according to the above embodiment of the present invention in view that two bare cells are connected to a single connection tab and the two bare cells are laminated in the vertical direction.

In the secondary battery according to the embodiment of the present invention, the connection tab may be folded after the electrode tabs are welded to the connection tab. On the contrary, in the secondary battery according to another exemplary embodiment of the present invention, the connection tab may be folded before the electrode tabs are welded to the connection tab. Thus, the first and second bare cells are laminated in the vertical direction when the electrode tabs are welded so that they are parallel to each other and may come in contact.

The secondary battery according to another exemplary embodiment of the present invention includes first and second laminated bare cells 100 and 200, electrode tabs 110 and 210 having positive and negative electrode tabs respectively withdrawn from positive and negative electrode tabs of the first and second bare cells 100 and 200, the connection tab 300 welded to the electrode tabs 110 and 210, and an insulator 500 partially attached to a surface of the connection tab 300.

As described above, the first and second bare cells 100 and 200 and the first and second electrode tabs 110 and 210 having the positive and negative electrode tabs withdrawn from the first and second bare cells 100 and 200 of the secondary battery according to another exemplary embodiment of the present invention are the same as those of the secondary battery according to the above embodiment of the present invention. Thus, same reference numerals are assigned to same components and their drawings and descriptions will be omitted.

In the secondary battery according to another exemplary embodiment of the present invention, the connection tab 300 is folded approximately along the center line before the two electrode tabs 110 and 210 are welded to the connection tab 300.

When the connection tab 300 is folded, the connection tab 300 may be welded to the electrode tabs 110 and 220 of the first and second bare cells 100 and 200. Thus, the first and second bare cells 100 and 200 are electrically connected to each other and are laminated in the vertical direction.

A manufacturing method of the secondary battery according to another exemplary embodiment of the present invention will be described as follows.

Figure 5C:
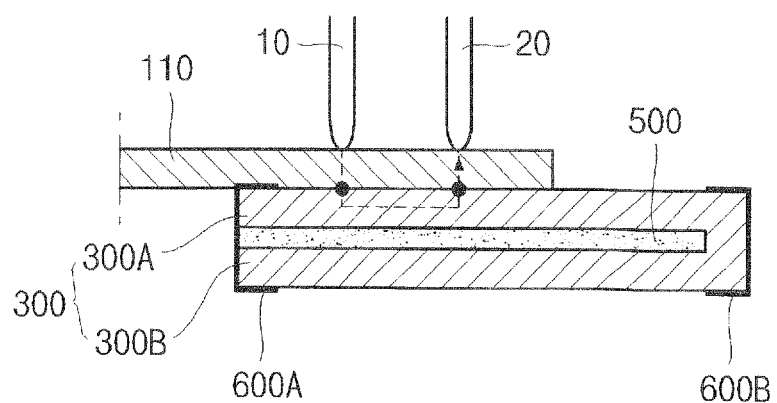
FIGS. 5C and 5D are schematic views illustrating welding state between an electrode tab and a connection tab of a secondary battery according to another embodiment of the present invention.

Referring to FIG. 5C, in the secondary battery according to another exemplary embodiment of the present invention, the insulator 500 may be formed on a surface of the connection tab 300 having a positive electrode connection tab 331 and a negative electrode connection tab 332. Any material used for electric insulation may be used as the insulator 500. Polyimide resin may be mainly used as the electric insulator but is not limited thereto.

The insulator 500 formed on a surface of the connection tab 300 is positioned inside the connection tab 300 when the connection tab 300 is folded. Thus, the connection tab 300 may be divided into a top connection tab 300A and a bottom connection tab 300B by the insulator 500 inserted therebetween.

An end of the connection tab 300 is fixed by a cover layer 600A. The connection tab 300 may further include a cover layer 600B surrounding an opposite end where the top connection tab 300A and the bottom connection tab 300B are connected to each other. The top and bottom connection tabs 300A and 300B maintain the parallel state due to the cover layer 600A or the cover layer 600B. Thus, the insulator 500 which is inserted into the connection tab 300 is prevented from being released out of the connection tab 300. The cover lays 600A and 600B may be made of insulator. The insulator 500 and the cover lays 600A and 600B may be made of same material, but are not limited thereto.

FIG. 5C illustrates spot welding between the connection tab 300 and the electrode tab 110 of the first bare cell 100. Welding between the connection tab 300 and the electrode tab 110 is performed in the series spot welding in which electric current is applied to perform welding between the connection tab 300 and the electrode tab 110 when the electrode tab 110 is seated on the top connection tab 300A of the connection tab 300 and two welding rods 10 and 20 are arranged in parallel.

Figure 5D:
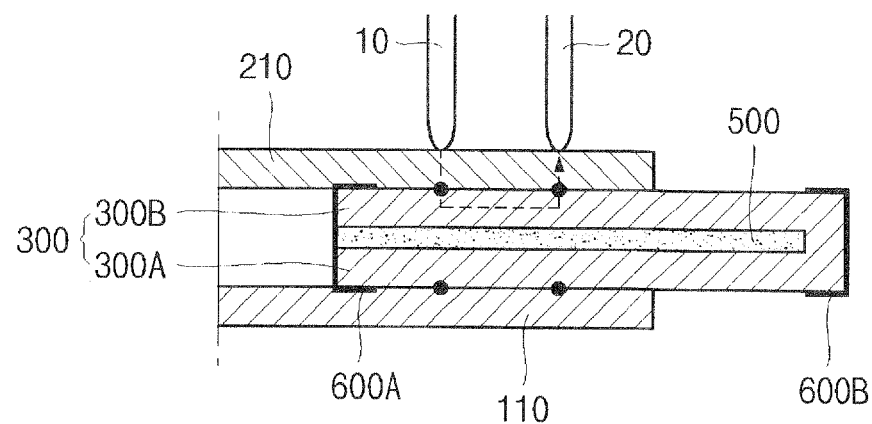

FIG. 5D shows the series spot welding of the electrode tab 210 of the second bare cell 200 when the connection tab 300 as illustrated in FIG. 5C is turned over by 180 degrees. The electrode tab 210 is welded to the connection tab 300 by applying electric current to two welding rods 10 and 20 when the electrode tab 210 of the second bare cell 200 is seated on the bottom connection tab 300B of the connection tab 300.

As such, the electrode tab 110 of the first bare cell 100 may be welded to the top connection tab 300A and the electrode tab 210 of the second bare cell 200 is welded to the bottom connection tab 300B. Thus, the first and second bare cells 100 and 200 are electrically connected to the top and bottom surfaces of the connection tab 300. The first and second bare cells 100 and 200 are laminated in the vertical direction.

Next, a secondary battery according to still another exemplary embodiment of the present invention will be described.

In the secondary battery according to still another exemplary embodiment of the present invention, electrode tabs of two bare cells are respectively connected to each other by two connection tabs which are laminated in the vertical direction. The secondary battery according to still another embodiment of the present invention is different from the secondary battery according to the embodiment of the present invention in view that electrode tabs of first and second laminated bare cells are electrically connected to the two laminated connection tabs respectively.

Figure 6A:
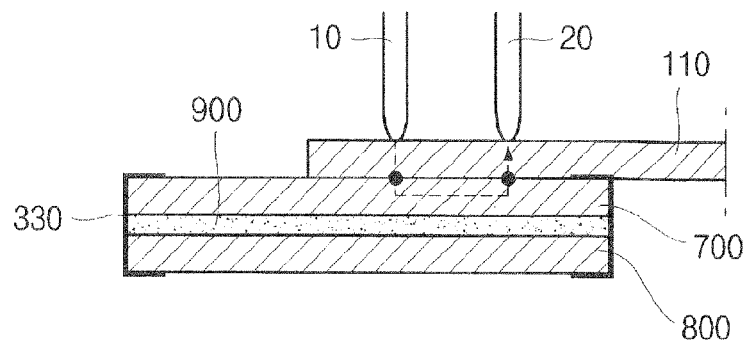
FIGS. 6A, 6B and 6C are schematic views illustrating welding between an electrode tab and a connection tab of a secondary battery according to still another embodiment of the present invention.
Figure 6B:
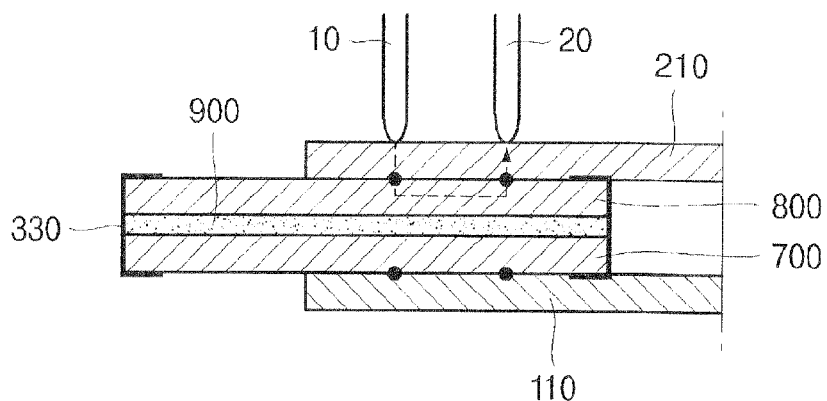
Figure 6C:
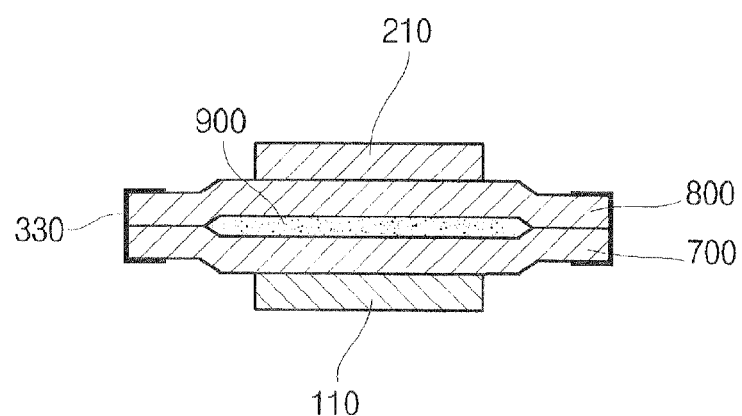

A secondary battery according to still another exemplary embodiment of the present invention, as illustrated in FIGS. 6A, 6B and 6C, includes first and second bare cells 100 and 200, first and second electrode tabs 110 and 210 having positive and negative electrode tabs respectively withdrawn from positive and negative electrodes of the first and second bare cells 100 and 200, two connection tabs 700 and 800 welded to the electrode tabs 110 and 210, and an insulator 900 inserted between the two connection tabs 700 and 800.

The secondary battery according to still another exemplary embodiment of the present invention is identical to the secondary battery according to the embodiment of the present invention in view of the first and second bare cells 100 and 200 and the first and second electrode tabs 110 and 210 having the positive and negative electrode tabs withdrawn from the first and second bare cells 100 and 200. Thus, same reference numerals are assigned to the same components and their drawings and descriptions will be omitted.

The connection tabs 700 and 800 are approximately identical to the above-mentioned connection tab 300. Outer surfaces of the connection tabs 700 and 800 are surrounded by a cover layer 330 made of a protection film. The cover layer 330 may be not formed on regions of the connection tabs 700 and 800 to which the electrode tabs 110 and 210 are welded.

The insulator 900 is disposed between the connection tabs 700 and 800 and has a size corresponding to that of the connection tabs 700 and 800. Any material used for electric insulation and an equivalent may be used as the insulator 900.

In the secondary battery according to still another exemplary embodiment of the present invention, the electrode tabs 110 and 210 of the first and second bare cells 100 and 200 are welded to the first and second connection tabs 700 and 800, respectively. Thus, in comparison to a case of welding the electrode tabs 110 and 210 to a single connection tab, the folding of the connection tab may be canceled.

In the still another exemplary embodiment, the insulator 900 is disposed between the first connection tab 700 and the second connection tab 800 and series spot welding is performed.

A manufacturing method of the secondary battery according to still another embodiment of the present invention will be described.

Referring to FIG. 6A, the electrode tab 110 of the first bare cell 100 is connected to the first connection tab 700. That is, spot welding is performed with two welding rods 10 and 20 in the series welding method. The first electrode tab 110 brings into surface contact with the first connection tab 700 and the first connection tab 700 and the second connection tab 800 are insulated from each other by the insulator 900. When electric current flows through the first electrode tab 110 and the first connection tab 700, the first electrode tab 110 is welded to the first connection tab 700. Thus, the welding length is short and maximal welding effect may be exhibited within a short time period.

FIG. 6B shows the connection of the electrode tab 210 of the second bare cell 200 to the second connection tab 800. The connection performed by the series spot welding with two welding rods 10 and 20 is identical to the case as illustrated in FIG. 6A. In this case, the second electrode tab 210 brings into surface contact with the second connection tab 800 and the first connection tab 700 is insulated from the second connection tab 800 by the insulator 900. Thus, electric current applied through the two welding rods 10 and 20 passes through the second electrode tab 210 and the second connection tab 800 so that the welding is performed within the shorted welding length and time.

FIG. 6C shows the connection of the electrode tab 210 of the second bare cell 200 to the second connection tab 800. Further, the connection of the electrode tab 110 of the second bare cell 200 to the second connection tab 700 is also illustrated. An insulator 900 is provided between the connection tabs (700 and 800).

As described above, the electrode tab 110 of the first bare cell 100 and the electrode tab 210 of the second bare cell 200 are electrically connected and welded to the connection tabs 700 and 800. Thus, after the electrode tabs 110 and 210 are welded to the connection tabs 700 and 800, the first bare cell 100 and the second bare cell 200 are laminated in the vertical direction.

The first and second bare cells 100 and 200 may be electrically connected to the PCM 400 through the two connection tabs 700 and 800, and finally form a battery pack.

Next, a method of electrically welding two bare cells to two connection tabs according to still another exemplary embodiment of the present invention will be described in detail.

Referring to FIGS. 7A to 7E, an upper jig 30 and a lower jig 40 are installed to be spaced apart from each other by guide rods 50 provided at four corners. In the upper jig 30, a first jig 60, including the first and second connection tabs 700 and 800 and the insulator 900 disposed between the first and second connection tabs 700 and 800, is installed. The first jig 60 is installed such that the first connection tab 700 is exposed to the outside. When a second jig 70 on which the first bare cell 100 is mounted is positioned above the first jig 60, the first connection tab 700 on the first jig 60 faces the electrode tab 110 of the first bare cell 100 mounted on the second jig 70 (See FIG. 7A).

Figure 7A:
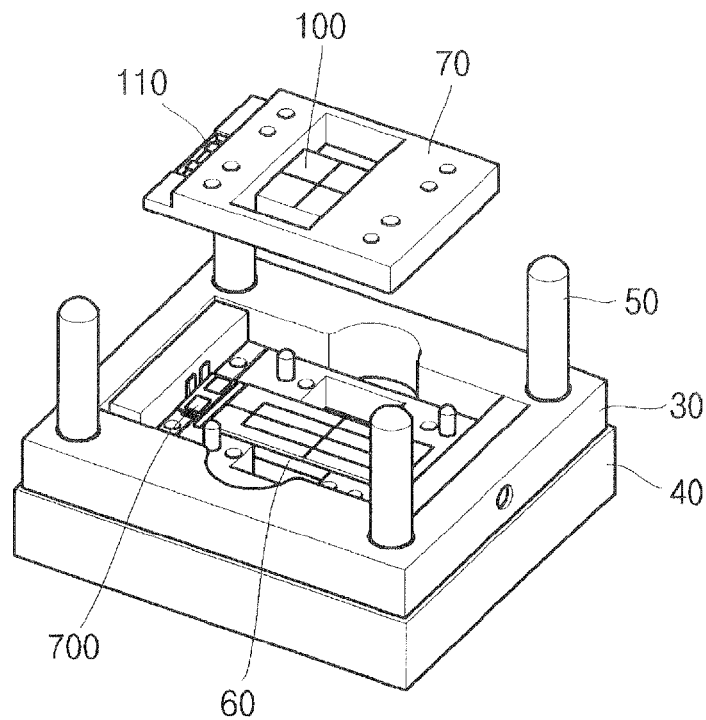
FIGS. 7A to 7E are perspective views sequentially illustrating process of welding an electrode tab to two connection tabs.
Figure 7B:
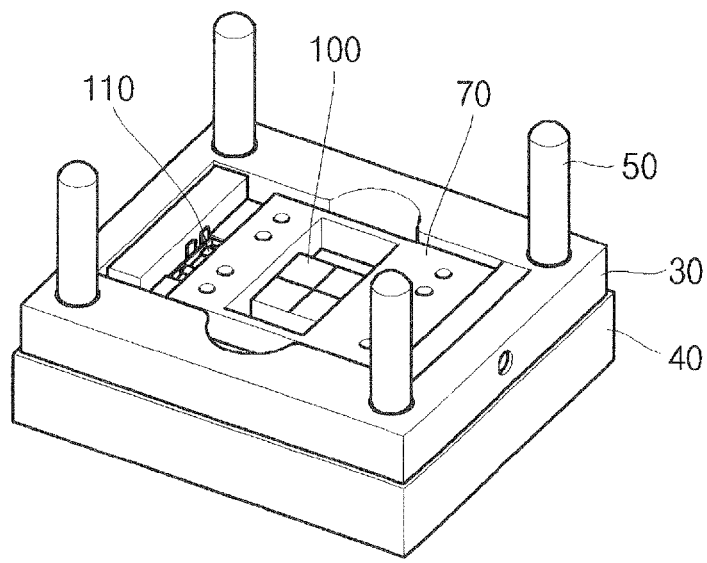
Figure 7C:
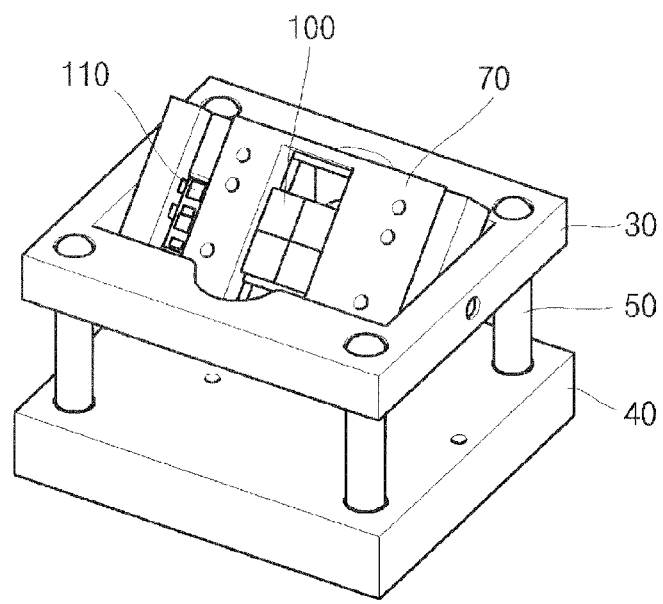

Thus, the first connection tab 700 and the electrode tab 110 of the first bare cell 100 may be welded in the series spot welding (See FIGS. 6A and 7B).

Next, the upper jig 30 is separated from the lower jig 40. At this time, the upper jig 30 is guided by the guide rods 50 and is spaced away from the lower jig 40. Then, the first and second jigs 60 and 70 are rotated by 180 degrees within the upper jig 30 (See FIG. 7C).

Figure 7D:
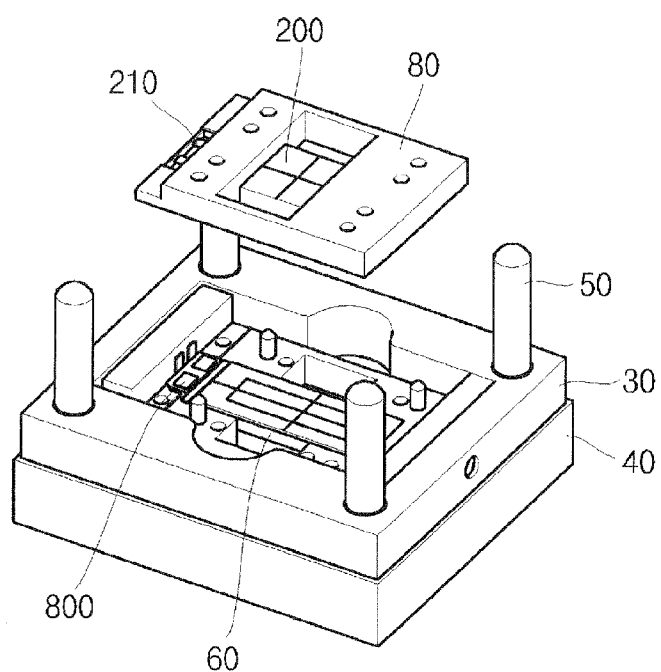

When the upper jig 30 is lowered to the lower jig 40, the second connection tab 800 on the first jig 60 is exposed to the outside (See FIG. 7D).

Figure 7E:
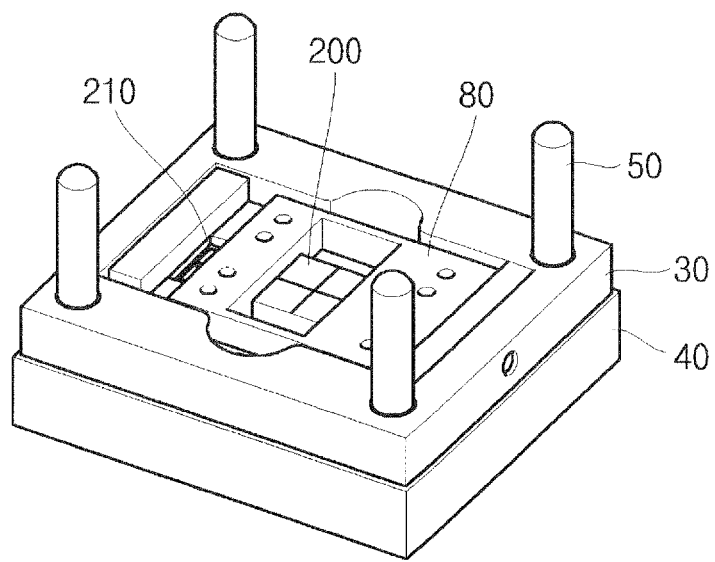

After that, a third jig 80 on which the second bare cell 200 is mounted is coupled to the upper side of the first jig 60 (See FIG. 7E).

Thus, the second connection tab 800 faces the electrode tab 210 of the second bare cell 200. By doing so, the second connection tab 800 and the electrode tab 210 of the second bare cell 200 may be welded to each other in the series spot welding (See FIG. 6B).

As described above, when the upper and lower jigs 30 and 40, the first jig 60 on which the first and second connection tabs 700 and 800 are mounted, the second jig 70 on which the first bare cell 100 is mounted, and the third jig 80 on which the second bare cell 200 is mounted are used, the welding between the electrode tabs and the connection tab may be easily and precisely performed.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined by the appended claims.

What is claimed is:

1. A method of manufacturing a secondary battery, comprising:
    an insulator composed of an electric insulation material, having two major surfaces and a plurality of sides;
    disposing an insulation layer on one surface of a connection tab;
    folding the connection tab along a center line of the connection tab directly contacting both major surfaces;
    spot-welding one of the electrode tabs of a first and second bare cell to the folded connection tab; and
    welding electrode leads of the connection tab to electrode leads of a protective circuit module (PCM).

2. The method of manufacturing a secondary battery as recited in claim 1, wherein the electrode tabs of the first and second bare cells include a positive electrode tab and a negative electrode tab, and wherein the connection tab includes a positive electrode lead and a negative electrode lead.

3. The method of manufacturing a secondary battery as recited in claim 2, wherein the spot-welding of the electrode tabs of a first and second bare cell further comprises:
series spot welding the electrode tabs of the first electrode bare cells to a first side of the folded connection tab; and
series spot welding the electrode tabs of the second electrode bare cells to a second side of the folded connection tab.

4. The method of manufacturing a secondary battery as recited in claim 1, wherein the first and second bare cell are laminated so that the first and second bare cell are parallel and in contact with each other.

5. The method of manufacturing a secondary battery as recited in claim 1, wherein upon the folding of the connection tab, the insulating layer is sandwiched inside the connection tab and the connection tab is divided into a top connection tab above the insulating layer and a bottom connection tab below the insulting layer.

6. The method of manufacturing a secondary battery as recited in claim 5, wherein at least one end of the connection tab is surrounded by a cover layer.

7. A secondary battery, comprising:
an insulator composed of an electric insulation material having two major surfaces and a plurality of sides;
a connection tab folded 180 degrees along a center line to entirely surround and come in direct contact with the two major surfaces of the insulator;
a first bare cell having electrode tabs;
a second bare cell having electrode tabs, one of the electrode tabs of the first bare cell and one of the electrode tabs of the second bare cell series spot welded to the folded connection tab; and
a protective circuit module (PCM) having electrode leads connected to the connection tab.

8. The secondary battery as recited in claim 7, wherein the electrode tabs of the first and second bare cells include a positive electrode tab and a negative electrode tab, and wherein the connection tab includes a positive electrode lead and a negative electrode lead.

9. The secondary battery as recited in claim 8, wherein the positive electrode tabs of the first and second bare cells are spot welded to the positive electrode lead of the connection tab, and the negative electrode tabs of the first and second bare cells are spot welded to the negative electrode lead of the connection tab.

10. The secondary battery as recited in claim 7, wherein the first and second bare cell are laminated, causing the first and second bare cell to be parallel and in contact.

11. The secondary battery as recited in claim 7, wherein, with the folding of the connection tab, the insulator is sandwiched inside the connection tab and the connection tab is divided into a top connection tab above the insulating layer and a bottom connection tab below the insulting layer.

12. The secondary battery as recited in claim 11, wherein at least one end of the connection tab is surrounded by a cover layer.

13. The secondary battery as recited in claim 11, wherein the electrode tab of the first bare cell is spot welded to the top connection tab and the electrode tab of the second bare cell is spot welded to the bottom connection tab.

* * * * *